(12) United States Patent
Ito et al.

(10) Patent No.: US 7,714,516 B2
(45) Date of Patent: May 11, 2010

(54) LIGHTING CONTROL APPARATUS FOR VEHICLE LAMP

(75) Inventors: Masayasu Ito, Shizuoka (JP); Takanori Namba, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 954 days.

(21) Appl. No.: 11/496,530

(22) Filed: Jul. 31, 2006

(65) Prior Publication Data

US 2007/0030138 A1    Feb. 8, 2007

(30) Foreign Application Priority Data

Aug. 1, 2005    (JP) ................... P.2005-222624

(51) Int. Cl.
*G05F 1/00*    (2006.01)

(52) U.S. Cl. .............. 315/291; 315/295; 315/307; 315/308; 315/312; 315/82; 307/10.8; 307/31; 307/139; 362/475; 362/543; 362/545

(58) Field of Classification Search ............ 315/77, 315/82, 291, 294, 295, 307, 308, 312, 313, 315/362; 307/10.1, 10.8, 31, 139; 362/276, 362/460, 465, 475, 543, 545

See application file for complete search history.

(56) References Cited

U.S. PATENT DOCUMENTS

| | | | | |
|---|---|---|---|---|
| 6,443,602 B1 * | 9/2002 | Tanabe et al. | ............... | 362/465 |
| 6,505,947 B1 * | 1/2003 | Brinkmann et al. | ............ | 362/41 |
| 7,201,506 B2 * | 4/2007 | Ishida et al. | ................ | 362/544 |
| 7,402,961 B2 * | 7/2008 | Bayat et al. | ................. | 315/295 |
| 2005/0094414 A1 | 5/2005 | Ishida et al. | | |

FOREIGN PATENT DOCUMENTS

| | | |
|---|---|---|
| JP | 2004-123942 A | 4/1992 |
| JP | 2004-276737 | 10/2004 |

OTHER PUBLICATIONS

Official Action of the German Patent and Trademark Office issued in German Application No. 10 2006 035 620.9-31 dated Sep. 12, 2008 and English translation thereof, 5 pages.
Patent Abstracts of Japan, Publication No. 2004-276737, Publication Date: Oct. 7, 2004, 2 pages.
Office Action for Japanese Application No. 2005-222624 dated Nov. 18, 2009, and English translation thereof, 4 pages.
English Patent Abstract of JP4123942 from esp@cenet, published Apr. 23, 1992, 1 page.

* cited by examiner

*Primary Examiner*—Haissa Philogene
(74) *Attorney, Agent, or Firm*—Osha • Liang LLP

(57) ABSTRACT

When the level at an input terminal goes low upon the reception of a signal to dim an LED, a PNP transistor is rendered on and a voltage at the positive input terminal of an operational amplifier is raised, in accordance with a time constant that is defined by a resistor and a capacitor. In accordance with the increase in this voltage, a source current is supplied from the operational amplifier to a current detection terminal, and as the value of the source current is gradually increased, a current flowing across the shunt resistor of the switching regulator is gradually reduced. Further, the light emission level of the LED is gradually lowered from the fully lighted state to the 70% lighted state, and there is, for the LED, a light quantity change of about 30% in ten seconds.

2 Claims, 4 Drawing Sheets

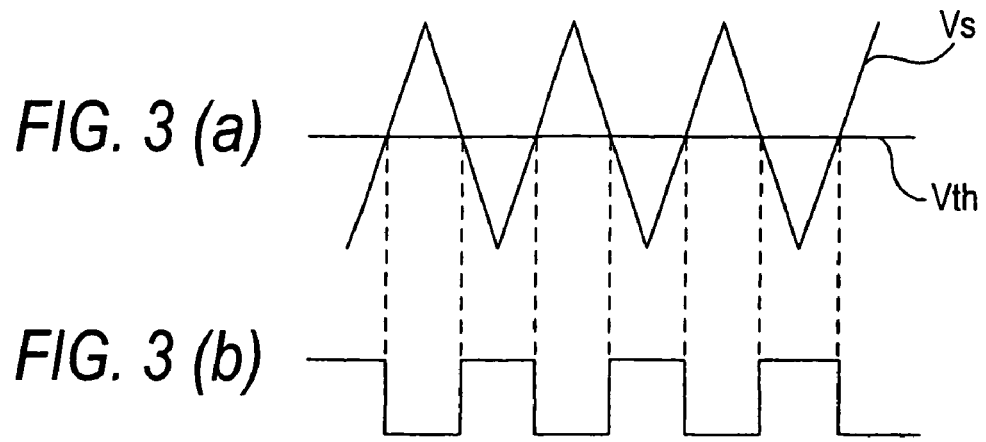
FIG. 3 (a)
FIG. 3 (b)
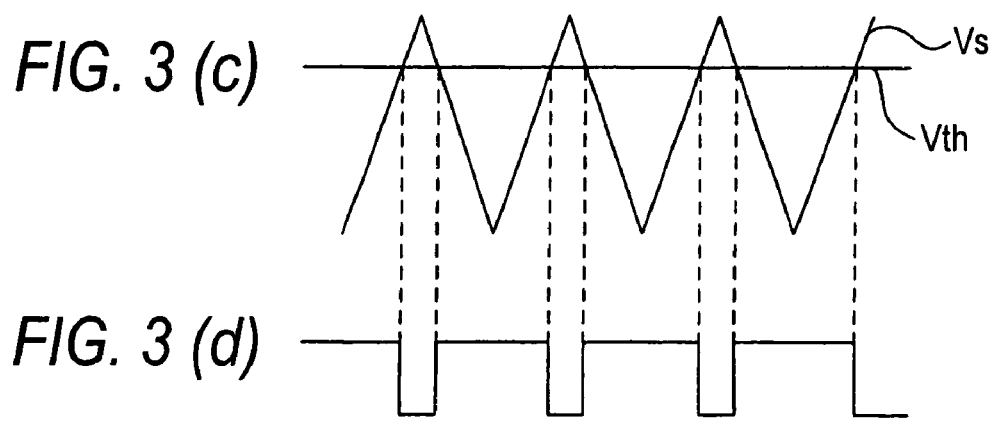
FIG. 3 (c)
FIG. 3 (d)
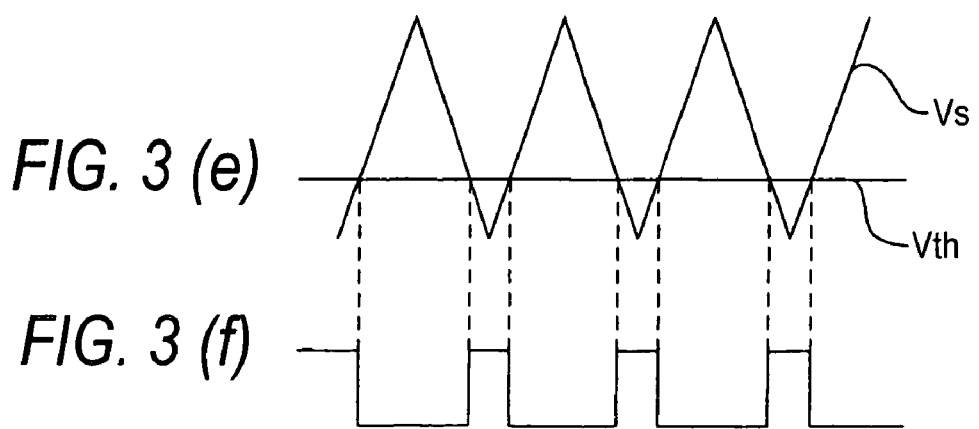
FIG. 3 (e)
FIG. 3 (f)

LIGHTING CONTROL APPARATUS FOR VEHICLE LAMP

The present application claims foreign priority based on Japanese Patent Application No. P.2005-222624, filed on Aug. 1, 2005, the contents of which are incorporated herein by reference.

BACKGROUND OF THE INVENTION

1. Field of the Invention

The present invention relates to a lighting control apparatus for vehicle lamp, and relates particularly to a lighting control apparatus, for vehicle lamp, that controls the lighting of a semiconductor light source constituted by a semiconductor light emitting device.

2. Related Art

Conventionally, a halogen lamp or a discharge lamp is employed as a lighting source for vehicle lamps. If the light quantity is changed, the service life of a light source of this type may be greatly reduced, or the maintenance of a long lighting period may not be possible. Therefore, since the light is on by supplying a consistent amount of power, such as 55 W or 35 W, a consistent amount of power always is consumed.

On the other hand, when a semiconductor light emitting device, such as an LED (a Light Emitting Diode), is employed as a light source for vehicle lamp, the quantity of light emitted by the light source can be freely varied by changing the current that is supplied. Therefore, when an LED is employed as a light source for vehicle lamp, only the current supplied for the LED must be adjusted to obtain an adequate light quantity in consonance with the operating state. For example, when a vehicle is halted and the light quantity is reduced, the consumption of power is lowered, and energy can also be saved. Further, when a vehicle is traveling at less than a predetermined speed, or when the temperature of vehicle lamp exceeds a threshold value, heat generation by an LED can be suppressed by reducing the current supplied to the LED (see JP-A-2004-276737). In this case, when the current supplied to the LED is reduced, a light quantity of the LED, unlike a discharge lamp, can be reduced without a fade out failure occurring.

Unlike a halogen lamp or a discharge lamp, a semiconductor light source, such as an LED, has a low heat resistance. Thus, while taking the service life and the deterioration of a semiconductor light source into account, a dimming of a semiconductor light source can effectively be performed and can contribute to the prevention of a rise in temperature at the semiconductor light source.

However, when a semiconductor light source is dimmed, this is accompanied with a drastic change in the light quantity, even though power can be saved. Therefore, a driver may feel unconformable and partially blinded, and this will degrade driving safety.

The present invention is provided to resolve these conventional shortcomings. One objective of the invention is to ensure driving safety by regulating the quantity of light emitted by a semiconductor light source, and to, in the process, save energy.

SUMMARY OF THE INVENTION

In accordance with one or more embodiments of the present invention, as a first aspect of the invention, a lighting control apparatus for a vehicle lamp is provided with:

a light quantity instruction value set up unit, for receiving information related to light source lighting and for setting a light quantity instruction value based on the information; and an energy supply unit, for supplying a voltage received from a power source to a low beam semiconductor light source in accordance with the light quantity instruction value, wherein, upon receiving information for instructing a dimming of the low beam semiconductor light source, the light quantity value instruction setup unit sets a first light quantity instruction value, which gradually reduces a lighting quantity of the low beam semiconductor light source to a first light emission level that conforms to the luminous intensity distribution standards for the reduction lighting of the low beam semiconductor light source, wherein, upon receiving information indicating that a high beam light source has been switched on, so that instead of the first light quantity instruction value, the light quantity instruction value setup unit sets a second light quantity instruction value for the low beam semiconductor light source to be dimmed at a second light emission level lower than the first light emission level for the first light quantity instruction value, and wherein, upon receiving information indicating that the high beam light source has been switched off, after the second light quantity instruction value has been set, the light quantity instruction value setup unit cancels the second light quantity instruction value and sets a third light quantity instruction value, in order to immediately switch on the low beam semiconductor light source at the first light emission level that conforms to the luminous intensity distribution standards.

ADVANTAGE

For the process during which a voltage received from a power source is applied to the low beam semiconductor light source, in accordance with the light quantity instruction value, when the first light quantity instruction value is set to gradually reduce the lighting quantity of the low beam semiconductor light source, the low beam semiconductor light source is gradually dimmed to a light emission level of 70%, relative to the 100% of full lighting. At this time, luminous intensity distribution standards, such as the luminous intensity distribution standards that are established by law, are employed to dim a low beam semiconductor light source. Thus, when the light quantity of the low beam semiconductor light source is changed as it is dimmed, a driver does not feel uncomfortable or experience the sensation of being blinded due to the change in the light quantity, safe driving is ensured, and energy can be saved.

When a high beam light source is switched on, instead of the first light quantity instruction value, the second light quantity instruction value is set and the light emission level is lowered until it is lower than the first light quantity instruction value, is lowered, for example, to 50% of the level for full lighting, and the low beam semiconductor light source is dimmed. Therefore, when the low beam semiconductor light source is dimmed, the luminous intensity distribution standards can be conformed with by switching on the high beam light source, and energy can be saved by dimming.

When the high beam light source is switched off, the second light quantity instruction value is canceled, the third light quantity instruction value is set, and the low beam semiconductor light source is immediately switched on at the light emission level that conforms to the luminous intensity distribution standards. Thus, when the high beam light source is switched off, the lighting of only the low beam semiconductor light source is recovered immediately, at a light emission level that conforms to the luminous intensity distribution standards, so that traveling safety can be obtained.

Further, in accordance with one or more embodiments of the present invention, as a second aspect of the invention, the light quantity instruction value setup unit may be provided with:

a charging circuit, for, when information for instructing the dimming of the low beam semiconductor light source is received, accumulating charges in a capacitor, in accordance with a charging time constant, by regarding, as a voltage in a fully-charged state, a voltage that is consonant with the light emission level that conforms to the luminous intensity distribution standards;

a discharging circuit, for, when information to instruct the dimming of the low beam semiconductor light source is canceled, discharging, in accordance with a discharging time constant, charges accumulated in the capacitor in the charging circuit;

a charging/discharging control circuit, for, upon receiving information indicating that the high beam light source has been switched on, blocking the charging circuit and generating, as a voltage for the ON state of the high beam light source, a high beam voltage that is higher than the voltage in the fully-charged state, and for, upon receiving information indicating that the high beam light source has been switched off, releasing, cutting off the charging circuit; and a light quantity instruction value generation circuit, for generating the first light quantity instruction value or the third light quantity instruction value in response to charges accumulated in the capacitor, and for generating the second light quantity instruction value in response to the high beam voltage.

(Advantage) When information to instruct dimming of the low beam semiconductor light source is received, charges are accumulated in the capacitor, in accordance with a charging time constant, by employing, as a voltage in a fully-charged state, a voltage that is consonant with the light emission level that conforms to the luminous intensity distribution standards. And the first light quantity instruction value is generated in response to charges accumulated in the capacitor. Further, when information to instruct dimming of the low beam semiconductor light source is canceled, charges accumulated in the capacitor are discharged, in accordance with a discharge time constant. On the other hand, when information indicating that the high beam light source has been switched on is received, the charging circuit is cut off, and a high beam voltage, which is higher than the voltage in the fully-charged state, is generated as a voltage in the ON state of a high beam. And the second light quantity instruction value is generated in response to the high beam voltage.

When information indicating that the high beam light source has been switched off is received, cutting off of the charging circuit is released, and the third light quantity instruction value is generated in response to charges accumulated in the capacitor, and the third light quantity instruction value is determined in accordance with the accumulated charge in the capacitor. When the capacitor is completely discharged, and when the low beam semiconductor light source is switched on in accordance with the third light quantity instruction value, the low beam semiconductor light source is fully lighted. That is, the third light quantity instruction value is varied, depending on the duration of the lighting period for the high beam light source, and when the high beam light source lighting period is long, the accumulated charge in the capacitor is completely discharged, and the low beam semiconductor light source is recovered in the fully lighted state. Even in a case wherein the lighting period for the high beam light source is short, when the high beam light source is switched on, the charging circuit of the capacitor is cut off, so that charging of the capacitor is interrupted, and the voltage on the capacitor is lower than the voltage in the fully-charged state. Thus, when the high beam light source is switched off and the low beam semiconductor light source is switched on, in accordance with the voltage on the capacitor, the low beam semiconductor light source can be lighted immediately at the light emission level that conforms to the luminous intensity distribution standards.

As is apparent from the above explanation, according to the lighting control apparatus of the first aspect, driving safety is ensured, and energy can be saved.

According to the second aspect, the light quantity instruction values can be generated using a simple circuit structure, and a reduction in costs obtained.

Other aspects and advantages of the invention will be apparent from the following description and the appended claims.

BRIEF DESCRIPTION OF THE DRAWINGS

FIGS. 3(a) to 3(f) are waveform diagrams for explaining the operation of the control circuit.

DETAILED DESCRIPTION OF THE EXEMPLARY EMBODIMENTS

Exemplary embodiments of the invention will be described with reference to the accompanying drawings.

Figure 1:
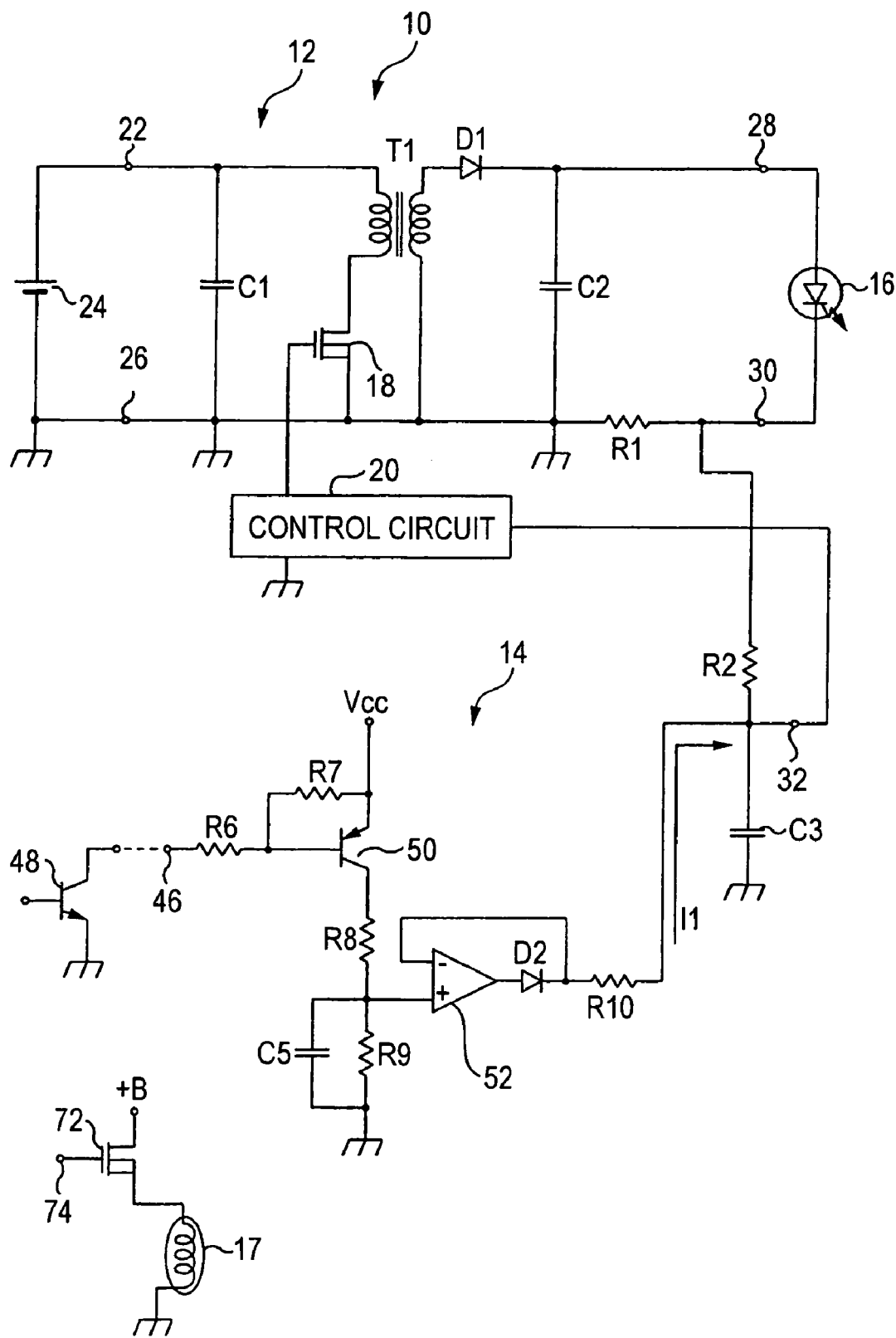
FIG. 1 is a diagram showing the circuit configuration of a lighting control apparatus, for vehicle lamp, according to a first exemplary embodiment of the present invention.
Figure 2:
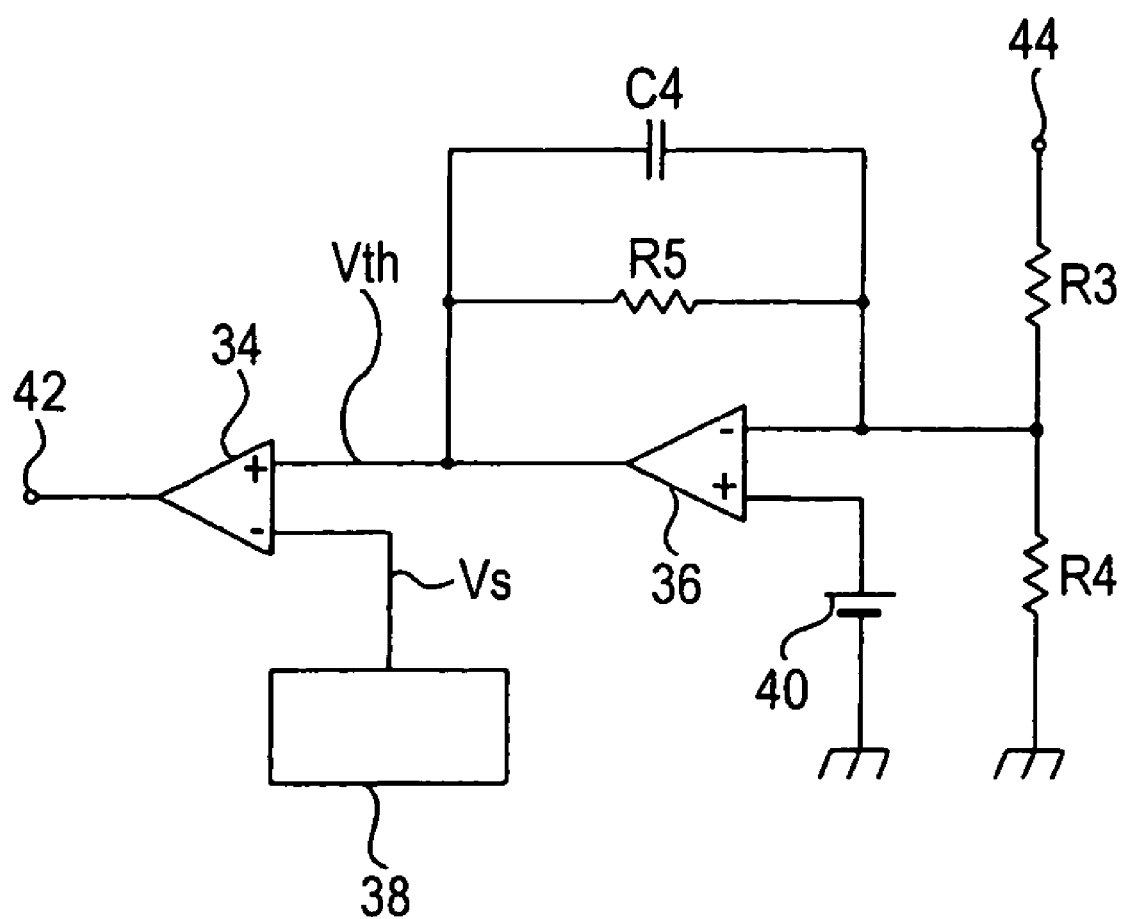
FIG. 2 is a diagram showing the circuit structure of a control circuit.
Figure 4:
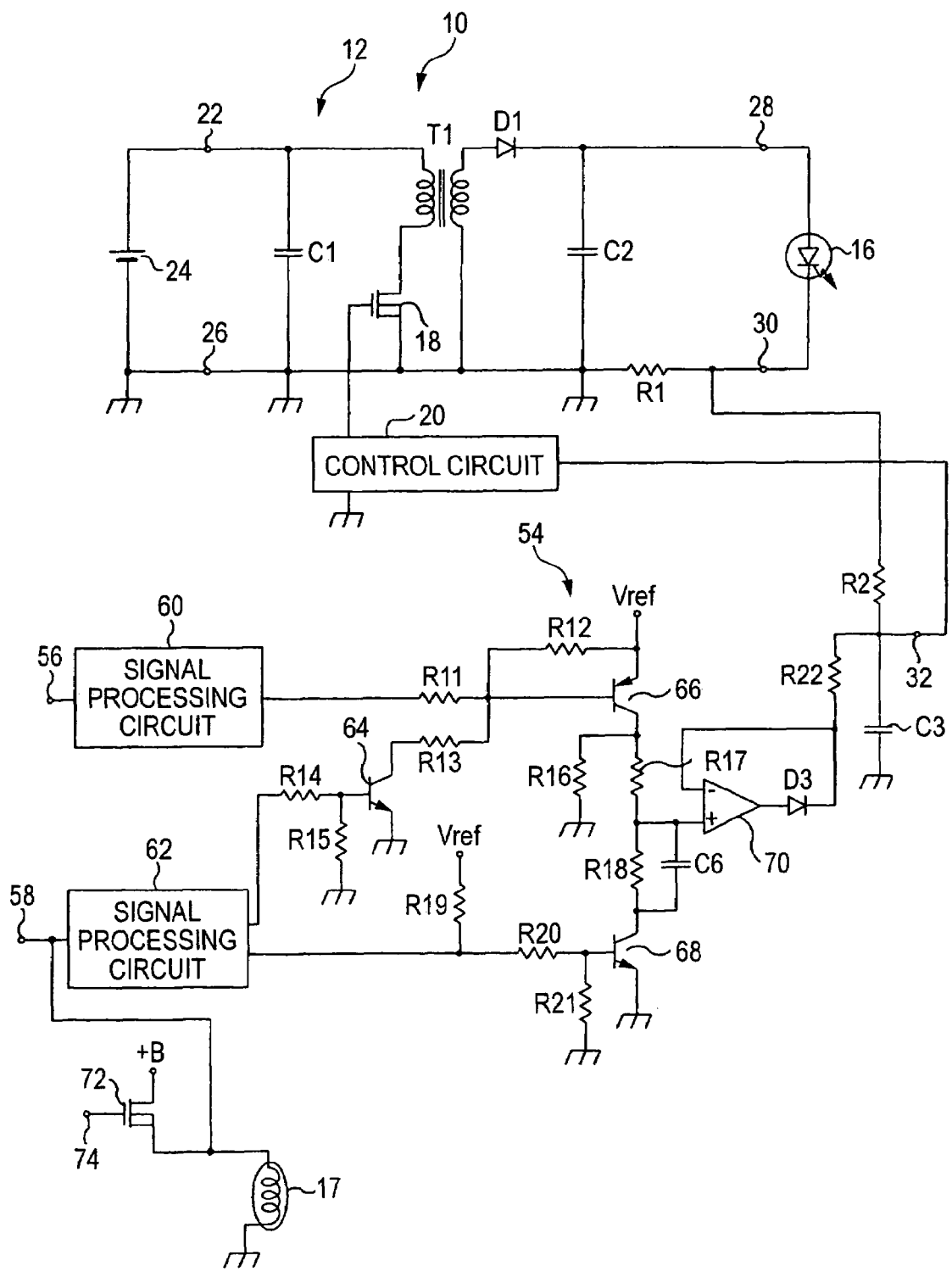
FIG. 4 is a diagram showing the circuit configuration of a lighting control apparatus, for vehicle lamp, according to a second exemplary embodiment of the present invention.

FIG. 1 is a diagram showing the circuit configuration of a lighting control apparatus, for vehicle lamp, according to a first exemplary embodiment of the present invention. FIG. 2 is a diagram showing the circuit structure of a control circuit, and FIGS. 3(a) to 3(f) are waveform diagrams for explaining the operation of the control circuit. FIG. 4 is a diagram showing the circuit configuration of a lighting control apparatus, for vehicle lamp, according to a second exemplary embodiment of the invention.

While referring to these diagrams, a lighting control apparatus 10, for vehicle lamp, includes: a switching regulator 12 and a dimming control circuit 14, as components of vehicle lamp (light emission device), and an LED 16 that is connected as a load to the switching regulator 12. The LED 16, a low beam semiconductor light source constituted by a semiconductor light-emitting device, is connected in parallel to the output side of the switching regulator 12, and is stored in a lamp chamber, with a halogen lamp 17 that serves as a high beam light source for a vehicle headlamp.

A plurality of LEDs 16 connected in series, or a plurality of LEDs 16 connected in parallel, may be employed. Further, the LEDs 16 can be provided as light sources for various types of vehicle lamp, such as stop lamps, tail lamps, fog lamps and turn signal lamps.

The switching regulator 12 includes: a transformer T1, a capacitor C1, an NMOS transistor 18, a control circuit 20, a diode D1, and capacitors C2 and C3 and shunt resistors R1 and R2. The capacitor C1 is connected in parallel to the primary side of the transformer T1 and the NMOS transistor 18 is connected in series. One end of the capacitor C1 is connected to the positive terminal of a vehicle-mounted battery 24, via a power input terminal 22, while the other end is connected to the negative terminal of the vehicle-mounted battery 24, via a power input terminal 26, and is also grounded. The drain of the NMOS transistor 18 is connected to the primary side of the transformer T1, the source is grounded, and the gate is connected to the control circuit 20. The capacitor C2 is connected in parallel to the secondary side of the transformer T1, via the diode D1, and a junction of the diode D1 and the capacitor C2 is connected to the anode of the LED 16 via an output terminal 28. One end of the transformer T1, on the secondary side, is grounded with one end of the capacitor C2, and is also connected to the cathode of the LED 16, via the shunt resistor R1 and an output terminal 30. The capacitor C3 is connected in series with the output terminal 30, via the shunt resistor R2, and the junction of the shunt resistor R2 and the capacitor C3 is connected to the control circuit 20 via a current detection terminal 32.

That is, a current flowing across the LED 16 is detected by the shunt resistor R1, the capacitor C3 is charged by a voltage applied at both ends of the shunt resistor R1, and a voltage applied at both ends of the capacitor C3 is fed back to the control circuit 20 as a current detected for the LED 16.

The NMOS transistor 18 serves as a switching device that is switched on or off in response to an ON/OFF signal (a switching signal) that is output by the control circuit 20. When the NMOS transistor 18 is rendered on, a voltage supplied by the vehicle-mounted battery (the DC power source) 24 is accumulated as electromagnetic energy in the transformer T1, and when the NMOS transistor 18 is rendered off, the electromagnetic energy accumulated in the transformer T1 is discharged from the secondary side of the transformer T1, via the diode D1, to the LED 16.

That is, the switching regulator 12 serves as an energy supply unit, for converting, into electromagnetic energy, a voltage supplied by the vehicle-mounted battery 24, and for supplying the electromagnetic energy to the LED 16. In this case, the switching regulator 12 compares the voltage at the current detection terminal 32 with a regulated voltage, and controls the output voltage in accordance with the comparison results.

Specifically, as shown in FIG. 2, the control circuit 20, which controls the output voltage of the switching regulator 12, includes: a comparator 34, an error amplifier 36, a sawtooth wave generator 38, a power source for a reference voltage 40, resistors R3, R4 and R5, and a capacitor C4. An output terminal 42 of the comparator 34 is connected to the gate of the NMOS transistor 18, and an input terminal 44 connected to one end of the resistor R3 is connected to the current detection terminal 32. It should be noted that a preamplifier may be located between the output terminal 42 and the NMOS transistor 18. A voltage fed back from the current detection terminal 32 is applied to the input terminal 44 and is divided by the resistors R3 and R4, and a voltage obtained by voltage division is applied to the negative input terminal of the error amplifier 36. The error amplifier 36 regards as a threshold value Vth a voltage that is consonant with a difference between the voltage applied to the negative input terminal and the reference voltage 40, and outputs this value Vth to the positive input terminal of the comparator 34. The comparator 34 receives a sawtooth voltage Vs, from the sawtooth wave generator 38, at the negative input terminal, and compares the sawtooth voltage Vs with the threshold value Vth and outputs an ON/OFF signal consonant with the comparison results to the gate of the NMOS transistor 18.

When, for example, the level of the threshold value Vth is located in the middle of the sawtooth voltage Vs, as shown in FIGS. 3A and 3B, the comparator 34 outputs an ON/OFF signal having a duty cycle of nearly 50%. And when the level of a voltage fed back from the current detection terminal 32 is lower than the reference voltage 40 as the voltage output by the switching regulator 12 is dropped, the level of the threshold value Vth output by the error amplifier 36 is raised, and as shown in FIGS. 3C and 3D, the comparator 34 outputs an ON/OFF signal having a duty cycle greater than 50%. As a result, the output voltage of the switching regulator 12 is raised.

On the other hand, when the level of a voltage fed back from the current detection terminal 32 is higher than the reference voltage 40 as the voltage output by the switching regulator 12 is increased, and when the level of the threshold value Vth output by the error amplifier 36 is reduced, as shown in FIGS. 3E and 3F, the comparator 34 outputs an ON/OFF signal having a duty cycle of less than 50%, and as a result, the output voltage of the switching regulator 12 is lowered. It should be noted that a triangular wave generator, for generating a triangular wave (a triangular wave signal), can be employed instead of the sawtooth wave generator 38.

The dimming control circuit 14 serves as a light quantity instruction value setup unit, for setting a light quantity instruction value in accordance with the contents of input information related to the switching on of a light source, and for outputting the light quantity instruction value to the switching regulator 12. When a signal at a low level is input to the input terminal 46 as information related to the switching on of the light source for the vehicle lamp, such as information that instructs the dimming of the LED 16, a low beam semiconductor light source, and that indicates a vehicle is travelling at a speed slower than a rated value, the dimming control circuit 14, in response to this signal, outputs a source current I1 as a first light quantity instruction value to the current detection terminal 32. The input terminal 46 is connected to the collector of a vehicle-side open collector transistor 48 via a cable or a harness, and the vehicle-side open collector transistor 48 is rendered on in response to a signal (a signal at a high level) for dimming the LED 16, or is rendered off in all other cases. When the vehicle-side open collector transistor 48 is rendered on, it is ascertained that a signal at a low level has been transmitted to the input terminal 46 as information for instructing the dimming of the LED 16, and the source current I1, from the dimming circuit 14, is supplied to the current detection terminal 32.

As shown in FIG. 1, the dimming control circuit 14 includes a PNP transistor 50, an operational amplifier 52, resistors R6, R7, R8, R9 and R10, a capacitor C5 and a diode D2.

The base of the PNP transistor 50 is connected, via the resistor R6, to the input terminal 46, the emitter is connected to a power source VCC and the collector is connected, via the resistor R8, to the positive input terminal of the operational amplifier 52, the capacitor C5 and the resistor R9. When the level at the input terminal 46 goes low, in order to dim the LED 16, the PNP transistor 50 is rendered on, and in the other case, i.e., when the level at the input terminal 46 is high, the off status of the PNP transistor 50 is maintained. When the PNP transistor 50 is rendered on, a charge current, from the power source Vcc, is supplied via the resistor R8 to the capacitor C5, to accumulate a charge in the capacitor C5. That is, the PNP transistor 50, the resistor R8 and the capacitor C5 constitute a charging circuit. In this case, a charging time constant, defined by the resistor R8 and the capacitor C5, is set, for example, to ten seconds or longer. Is set, that is, for a period such that a driver remains unaware of a change in the light quantity of the LED 16.

When the low level at the input terminal 46 is inverted, to high, the PNP transistor 50 is rendered off, and the charge accumulated by the capacitor C5 is discharged via the resistor R9. That is, the capacitor C5 and the resistor R9 constitute a discharge circuit, and a discharge time constant, defined by the capacitor C5 and the resistor R9, is set to ten seconds or longer, as is the charging time constant for the charging circuit.

The operational amplifier 52 serves as a voltage follower, the output of which is fed back to the negative input terminal through the diode D2, and outputs to the current detection terminal 32 the source current I1, which is consonant with the voltage at both ends of the capacitor C5. When a source current of 0 is equivalent to a fully lighted level of 100%, this source current I1 is equivalent to the level of a dimming rate=30%, which corresponds to 70% of the fully lighted level.

This value conforms to the light emission level that conforms, in turn, to luminous intensity distribution standards, such as the luminous intensity distribution standards that are established by law. In this case, during the process for changing the voltage at both ends of the capacitor C5, the source current I1 is either gradually increased or gradually decreased, in accordance with the charging time constant or the discharge time constant.

When the source current flowing at the current detection terminal 32 is zero, the switching regulator 12 switches the LED 16 to full on (lighting 100%). And when the source current to be supplied to the current detection terminal 32 is increased from zero to the source current I1, the voltage at both ends of the capacitor C3 is gradually increased in accordance with the charging time constant. At this time, in accordance with the increase in the source current I1, the control circuit 20 gradually reduces the current flowing across the shunt resistor R1, in order to fix the voltage at the current detection terminal 32. Therefore, the fully lighted state of the LED 16 is gradually shifted to a 70% lighted state.

That is, the LED 16 is dimmed while the light quantity is gradually being changed from the fully lighted state to the 70% lighted state. At this time, there is, for the LED 16, a light quantity change of about 30% in ten seconds.

On the other hand, when the instruction to dim the LED 16 is canceled and the PNP transistor 50 is rendered off, the charge accumulated in the capacitor C5 is gradually discharged, and the source current I1 is gradually reduced. Then, the LED 16 is gradually returned from the 70% dimmed state to the fully lighted state. In this case also, there is, for the LED 16, a light quantity change of about 30% in ten seconds.

As described above, according to this exemplary embodiment, the light quantity of the LED 16 is gradually changed to dim the LED 16. Thus, when the light quantity of the LED 16 is changed, a driver does not feel uncomfortable or experience the sensation of being blinded, safe driving is ensured, and energy can be saved.

A second exemplary embodiment of the present invention will now be explained while referring to FIG. 4. According to this exemplary embodiment, a dimming control circuit 54 is employed instead of the dimming control circuit 14, and lighting of an LED 16 is controlled in accordance with the state of a halogen lamp 17, which is a high beam light source. The remainder of the configuration is the same as that shown in FIG. 1.

The dimming control circuit 54 serves as a light quantity instruction value setup unit, for setting three light quantity instruction values in accordance with the contents of input information related to the lighting of light sources, such as a low beam semiconductor light source and a high beam light source, and for outputting these light quantity instruction values to a switching regulator 12. When a signal at a low level is input to an input terminal 56 as information related to the lighting of a light source, such as information that instructs the dimming of the LED 16, which is a low beam semiconductor light source, and that indicates a vehicle is travelling at a speed slower than a rated value, the dimming control circuit 54 outputs to a current detection terminal 32 a source current I1, which is a first instruction value, in order to gradually dim the LED 16 until a light emission level is reached that conforms to the luminous intensity distribution standards for the dimming of the LED 16, for example, the luminous intensity distribution standards established by law.

Furthermore, when a signal at a high level is input to an input terminal 58 as information indicating a high beam light source (the halogen lamp 17) is to be switched on, the dimming control circuit 54 outputs, to the current detection terminal 32, a source current I2, which is a second light quantity instruction value, instead of the first light quantity instruction value, in order to dim the LED 16 until a light emission level is reached that is lower than that for the first light quantity instruction value.

Further, when the second light quantity instruction value has been set, and a signal at a low level is input to the input terminal 58 as information indicating that the high beam light source (the halogen lamp 17) has been switched off, the dimming control circuit 54 cancels the second light quantity instruction value and outputs to the current detection terminal 32 a source current I3, which is a third light quantity instruction value, in order to immediately switch on the LED 16 at the light emission level that conforms to the luminous intensity distribution standards.

Specifically, the dimming control circuit 54 includes: signal processing circuits 60 and 62, an NPN transistor 64, a PNP transistor 66, an NPN transistor 68, an operational amplifier 70, resistors R11, R12, R13, R14, R15, R16, R17, R18, R19, R20, R21 and R22, a capacitor C6 and a diode D3, and the input terminals of the signal processing circuits 60 and 62 are connected to input terminals 56 and 58.

Regardless of whether an offset of about 1V occurs at the input terminal 56, the signal processing circuit 60 removes an affect produced by a GND potential, in response to a voltage applied to the input terminal 56. When a signal at a low level is input at the input terminal 56, the signal processing circuit 60 outputs this signal via the resistor R11 to the base of the PNP transistor 66. The emitter of the PNP transistor 66 is connected to Vref, the base is connected through the resistor R11 to the signal processing circuit 60, and the collector is connected via the resistor R17 to the positive input terminal of the operational amplifier 70, the capacitor C6 and the resistor R18. When a signal at a low level is received by the input terminal 56, the PNP transistor 66 is rendered on, and when the NPN transistor 64 is rendered on, the PNP transistor 66 is also rendered on, regardless of what the level is at the input terminal 56. When the NPN transistor 64 is rendered off, and when the level at the input terminal 56 goes high, the PNP transistor 66 is rendered off.

When the PNP transistor 66 is rendered on under the conditions wherein the NPN transistor 68 is on, a charge current is supplied by Vref, via the resistor R17, to charge the capacitor C6. The charging time constant, defined by the resistor R17 and the capacitor C6, is set to ten seconds or longer, which is a period such that a driver remains unaware that there has been a change in the light quantity of the LED 16. In this case, the PNP transistor 66, the NPN transistor 68, the resistor R17 and the capacitor C6 constitute a charging circuit.

On the other hand, when the PNP transistor 66 is rendered off, regardless of the conditions for the rendering on or off the NPN transistor 68, the charge accumulated on the capacitor C6 is discharged via the resistor R18. As well as the charging time constant, a discharge time constant, defined by the capacitor C6 and the resistor R18, is set to ten seconds or longer.

During the charging/discharging process performed by using the capacitor C6 as a base, a voltage applied at both ends of the capacitor C6 is gradually changed, in accordance with the charging time constant or the discharge time constant. When the voltage at both ends of the capacitor C6 is changed, the voltage at the positive terminal of the operational amplifier 70 is also changed.

The operational amplifier 70 serves as a voltage follower, the output of which is to be fed back, via the diode D3, to the negative input terminal, and outputs to the current detection terminal 32 a source current in accordance with a voltage applied at the positive input terminal. For example, when the PNP transistor 66 is rendered on and a charge current is supplied to the capacitor C6, the source current I1, the value of which is gradually increased, is supplied to the current detection terminal 32 in accordance with the charge (the voltage at both ends of the capacitor C6) accumulated by the capacitor C6.

The voltage when the capacitor C6 is fully charged is set so that it conforms with a light emission level that conforms, in turn, with the luminous intensity distribution standards for dimming the LED 16, such as the luminous intensity distribution standards established by law. For example, this voltage is set in correlation with the lighting, 70% of the fully lighted level, of the LED 16 at a dimming rate=30%.

Specifically, when the source current of 0 is equivalent to the fully lighted state of 100%, the source current I1 is equivalent to the level of the dimming rate=30%, and is set at a level corresponding to 70% of the fully lighted state.

During the process whereby the voltage at both ends of the capacitor C6 is changed, the source current I1 is gradually increased or gradually decreased in accordance with the charging time constant or the discharge time constant. In this case, the operational amplifier 70, the diode D3 and the resistor R22 constitute a light quantity instruction value generation circuit that, in response to a charge accumulated on the capacitor C6, generates the source current I1 as the first light quantity instruction value.

When the source current 0 to be supplied to the current detection terminal 32 has been increased from 0 to the source current I1, and when the source current I1 is gradually increased, the voltage at both ends of the capacitor C3 is gradually raised.

At this time, in accordance with the increase in the source current I1, the control circuit 20 reduces a current flowing across the shunt resistor R1 in order to fix the voltage at the current detection terminal 32. Thus, the LED 16 is gradually shifted from the fully lighted state to the 70% lighted state. In this case, there is, for the LED 16, a light quantity change of about 30% in ten seconds.

On the other hand, the signal processing circuit 62 is connected to the input terminal 58 and is also connected to the halogen lamp 17 and an NMOS transistor 72. The gate of the NMOS transistor 72 is connected to a high beam driver switch (not shown), via a terminal 74, and the drain is connected to a plus terminal (+B) of a vehicle-mounted battery 24. When the high beam driver switch is turned on by a driver, the NMOS transistor 72 is rendered on, the high beam halogen lamp 17 is switched on, and the level at the input terminal 58 goes high.

When a signal at a high level is then input to the input terminal 58, as information indicating that the high beam halogen lamp 17 has been switched on, the signal processing circuit 62 outputs a low-level signal to the NPN transistor 68 and a high-level signal to the NPN transistor 64. That is, when the high beam halogen lamp 17 is switched on, the NPN transistor 64 is rendered on, the PNP transistor 66 is forcibly rendered on and the NPN transistor 68 is rendered off, regardless of the level at the input terminal 56.

When the NPN transistor 68 is rendered off, the charging circuit for accumulating a charge on the capacitor C6 is cut off, and a voltage Vref is generated as a high beam voltage, which is higher than a voltage in the fully-charged state of the capacitor C6, and is applied to the positive input terminal of the operational amplifier 70. When, instead of the first light quantity instruction value, the high beam voltage Vref is applied to the positive input terminal of the operational amplifier 70, the source current I2 is supplied as the second instruction value in order to dim the LED 16 to a light emission level that is lower than that for the first light quantity instruction value. The source current I2 is set, for example, in correlation with the dimming rate=50%. Therefore, when the source current I2 is supplied to the current detection terminal 32, the voltage at both ends of the capacitor C3 is raised, as is the increase in the source current I2 at the current detection terminal 32. At this time, in accordance with the increase in the source current I2, the control circuit 20 reduces a current flowing across the shunt resistor R1 in order to fix the voltage at the current detection terminal 32. Therefore, the LED 16 is switched on in the 50% lighted state. In this case, since the high beam halogen lamp 17 is lighted, even when the LED 16, which is a low beam semiconductor light source, is dimmed, the luminous intensity distribution can be satisfied by the lighting of the two lamps.

When a signal at a low level is input to the input terminal 58 as information indicating that the high beam halogen lamp 17 has been switched off, the signal processing circuit 62 outputs a high-level signal to the NPN transistor 68 and a low-level signal to the NPN transistor 64. That is, when the high beam halogen lamp 17 is changed from the ON state to the OFF state, the NPN transistor 68 is rendered on and the NPN transistor 64 is rendered off. And when the NPN transistor 68 is rendered on, cut off of the charging circuit, used to accumulate a charge on the capacitor C6, is released. In this case, the NPN transistor 68, the PNP transistor 66 and the resistors R17, R18, R19, R20 and R21 constitute a charging/discharge control circuit.

Assume a case wherein the lighted state of only the LED 16 is recovered when the high beam halogen lamp 17 has been changed from the ON state to the OFF state. In this case, when the state wherein the LED 16 lighted level of 50% is recovered, the dimming rate is greater than 30%, so that the luminous intensity distribution standards may not be satisfied.

Therefore, in this exemplary embodiment, when the high beam halogen lamp 17 is switched off, the operational amplifier 70 supplies to the current supply terminal 32 a source current I3, as the third light quantity instruction value, in order to immediately light the LED 16 at a light emission level that conforms to the luminous intensity distribution standards, e.g., under conditions wherein the dimming rate is smaller than 30%.

Specifically, when the high beam halogen lamp 17 is lighted, the NPN transistor 68 is rendered off, the charging circuit for accumulating a charge on the capacitor C6 is cut off and a new charge is not accumulated on the capacitor C6. And when the high beam halogen lamp 17 is lighted for an extended period of time, the charge accumulated on the capacitor C6 is discharged via the resistor R18. Therefore, when the high beam halogen lamp 17 is changed from the ON state to the OFF state, the voltage at both ends of the capacitor C6 is near 0 V, and since a current that is substantially 0 is set as the source current I3, the fully lighted state of the LED 16 can be immediately recovered.

When a lighting period for the high beam halogen lamp 17 is short and a charge is accumulated on the capacitor C6, the voltage at both ends of the capacitor C6 is also lower than the voltage in the fully charged state. Therefore, at a dimming rate of lower than 30%, the dimmed state of the LED 16 can be immediately recovered.

Therefore, even when the high beam halogen lamp 17 is switched from the ON state to the OFF state, the LED 16 can be immediately lighted at the light emission level that conforms to the luminous intensity distribution standards established by law, and safe driving is ensured.

According to the exemplary embodiments, the LED 16 is gradually shifted from the fully lighted state to the 70% dimmed state. Thus, when the light quantity of the LED 16 is changed in accordance with the dimming of the LED 16, a driver does not feel uncomfortable or experience the sensation of being blinded due to this change, safe driving is ensured, and energy can be saved.

Furthermore, when the high beam halogen lamp 17 is switched on, the LED 16 is dimmed by reducing the light emission level to 50%, relative to the fully lighted state. Therefore, even when the LED 16 lighted level is at 50%, the luminous intensity distribution standards can be satisfied by lighting the high beam halogen lamp 17, and because dimming is performed, energy can be saved.

Further, when the high beam halogen lamp 17 is switched off, the LED 16 is immediately switched on at the light emission level that satisfies the luminous intensity distribution standards. Thus, even when the high beam halogen lamp 17 is off, safe driving is ensured.

The above described effects can be obtained by a simple circuit structure requiring a small number of parts, and a cost reduction can be achieved.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A lighting control apparatus for a vehicle lamp, comprising:
   a light quantity instruction value setup unit that receives information related to a lighting of a light source and sets a light quantity instruction value based on the information;
   an energy supply unit that supplies a voltage received from a power source to a low beam semiconductor light source in accordance with the light quantity instruction value,
   when the light quantity instruction value setup unit receives information for instructing a dimming of the low beam semiconductor light source, the light quantity value instruction setup unit sets a first light quantity instruction value, so that a light quantity of the low beam semiconductor light source is gradually reduced to a first light emission level for the reduced lighting of the low beam semiconductor light source,
   when the light quantity instruction value setup unit receives information indicating that a high beam light source is switched on, the light quantity instruction value setup unit sets a second light quantity instruction value, so that the light quantity of the low beam semiconductor light source is reduced to a second light emission level lower than the first light emission level, and
   when the light quantity instruction value setup unit receives information indicating that the high beam light source is switched off after the second light quantity instruction value is set, the light quantity instruction value setup unit cancels the second light quantity instruction value and sets a third light quantity instruction value, so that the low beam semiconductor light source is immediately switched on at the first light emission level.

2. The lighting control apparatus according to claim 1, wherein the light quantity instruction value setup unit includes:
   a charging circuit that accumulates charges in a capacitor in accordance with a charging time constant, by regarding a voltage corresponding to the first light emission level as a voltage in a fully-charged state, when the light quantity instruction value setup unit receives the information for instructing of the dimming of the low beam semiconductor light source;
   a discharging circuit that discharges the charges accumulated in the capacitor in accordance with a discharging time constant, when the light quantity instruction value setup unit receives information for instructing to cancel the reduced lighting of the low beam semiconductor light source;
   a charging/discharging control circuit, that blocks the charging circuit and generates a high beam voltage higher than the voltage in the fully-charged state, as a voltage for the ON state of the high beam light source, when the light quantity instruction value setup unit receives the information indicating that the high beam light source is switched on, and releases the blocking of the charging circuit when the light quantity instruction value setup unit receives the information indicating that the high beam light source is switched off; and
   a light quantity instruction value generation circuit that generates the first light quantity instruction value or the third light quantity instruction value in response to charges accumulated in the capacitor, and generates the second light quantity instruction value in response to the high beam voltage.

* * * * *